United States Patent Office 3,534,138
Patented Oct. 13, 1970

3,534,138
ANTIBIOTIC SHINCOMYCIN AND PRODUCTION THEREOF
Nakao Ishida, Katsuo Kumagai, and Nobuyuki Nishimura, Sendai-shi, Japan, assignors to Kyowa Hakko Kogyo Kabushiki Kaisha, Tokyo-to, Japan, a body corporate of Japan
Continuation-in-part of application Ser. No. 557,432, June 14, 1966. This application Apr. 8, 1968, Ser. No. 719,449
Claims priority, application Japan, July 16, 1965, 40/35,500
Int. Cl. A61k 21/00
U.S. Cl. 424—120                                             8 Claims

ABSTRACT OF THE DISCLOSURE

The present invention relates to a new antibiotic, shincomycin, and to processes for its production.

RELATED APPLICATION

This application is a continuation-in-part of Ser. No. 557,432 filed June 14, 1966, in the name of the present inventors, now abandoned.

BACKGROUND OF INVENTION

The importance of antibiotics (produced by metabolic activity of micro-organisms) in treatment of animal and plant infections, and as growth factors in the farming industry, is well known. The present invention provides a complex of new antibiotics obtained from culture broths and from the mycelia of a streptomyces group. This new antibiotic complex is called "Shincomycin" and its chemical, physical and biological properties distinguish it from previously known antibiotics.

SUMMARY OF INVENTION

*Streptomyces phaeochromogenus* No. 903 (ATCC 19,081) is the strain from which the shincomycin is produced.

This culture is available to the public on an unrestricted basis.

We have discovered that upon cultivation of an actinomycete and specifically a species of the genus Streptomyces designated *Strepotomyces phaeochromogenus* No. 903 (ATCC 19,081) in a suitable culture medium therefor a new antibiotic complex is formed, which may be recovered from the resulting culture broth. The new antibiotic, i.e. the active material in the fermented broth, is called "Shincomycin."

According to one feature of the present invention, there is provided a process for producing shincomycin which comprises culturing *Streptomyces phaeochromogenus* No. 903 (ATCC No. 19,801) or a shincomycin-producing mutant strain thereof in a nutrient medium therefor under aerobic conditions.

The process according to the invention desirably includes the steps of separating the culture broth obtained from insoluble materials, extracting crude shincomycin from the broth with a water-insoluble organic solvent acidifying the resulting crude shincomycin solution to liberate shincomycin and recovering the resulting shincomycin.

It has been found that shincomycin is a complex comprising two antibiotics i.e. "Shincomycin A" and "Shincomycin B," both of which are antibiotics of the macrolide type. Shincomycin is substantially active towards gram positive microorganisms, and its physico-chemical properties distinguish it from various macrolide types having their ultra-violet absorption maxima at about 240 m$\mu$ e.g., carbomycin, cirramycin A and B, PA–148, and acumycin.

Several physico-chemical and biological properties of shincomycin according to the present invention are given below:

(a) PHYSICAL AND CHEMICAL PROPERTIES

Figure 1:
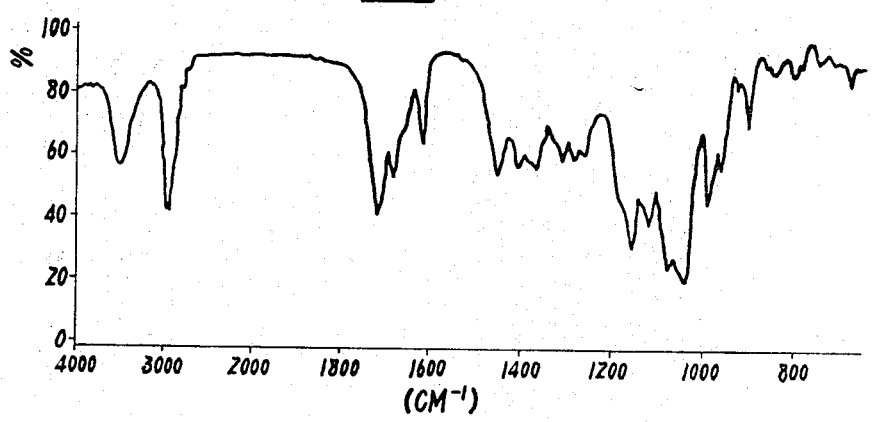
Figure 2:
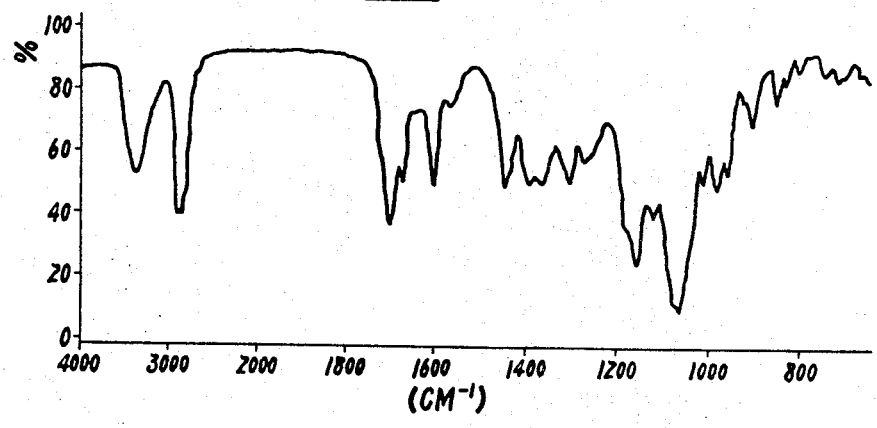

| | Shincomycin A | Shincomycin B |
|---|---|---|
| (1) State | Colourless needle crystals. | Colourless crystalline powder. |
| (2) Melting point (°C.) | 134–136 | 128–129. |
| (3) Molecular weight (osmometer). | 1,033 | 1,062. |
| (4) Molecular formula: | $C_{52}H_{89}O_{19}N$ | $C_{53}H_{90}ON$. |
| (5) Elementary analysis (percent): | | |
| C | 60.12 | 58.26. |
| H | 8.51 | 8.44. |
| O | 26.81 | 28.25. |
| N | 1.34 | 1.83. |
| (6) Specific rotation | $\alpha_D = -61.2°$ (c:1.25, chloroform). | $\alpha_D = \pm 0$ (c: 1.25, chloroform). |
| (7) Infra-red spectra | Fig. 1 and Fig. 2 respectively of the accompanying drawings show the infra-red spectra of Shincomycin A and Shincomycin B. | |
| (8) Solubility | Shincomycin is readily soluble in chloroform, benzene, acetone, methanol, ethanol, and ethyl acetate, slightly soluble in carbon disulphide and ether, and insoluble in water and petroleum ether. | |
| (9) Colour reactions: | | |
| Fehling's reaction | Positive | Negative. |
| Tollens' orcinol reaction | Red | Orange. |
| Sulphuric acid | Brown | Yellow. |
| Fishbach & Levine's reaction. | (Reference in Antibiotics and Chemotherapy, page 3, 1159, 1953.) | |
| (i) Carbomycin test | Brown | Bright reddish orange. |
| (ii) Erythromycin test | Reddish brown | Bright reddish orange. |
| (10) Stability | Shincomycin is stable in neutral or acidic aqueous solution and is active even when heated at 100° C. for 120 minutes at a pH of 5–7, but is unstable under alkaline conditions. | |
| (11) $R_f$ values on thin-layer chromatography, and colour reaction test. | Summarized in Table 1. | |

TABLE 1

| Solvent | Shincomycin A | Shincomycin B |
|---|---|---|
| Methanol:benzene (45:55) | 0.65 | 0.40. |
| Chloroform:methanol (4:1) | 0.66 | 0.38. |
| Acetone | 0.32 | 0.18. |
| Butanol:acetic acid:water (3:1:1) | 0.39 | 0.39. |
| Colour reaction (with 10% sulphuric acid). | Dark green | Yellowish brown. |

NOTES:
(i) Support: silica gel containing 5% calcium sulphate on an 8 cm. x 20 cm. x 0.25 cm. plate.
(ii) Development: ascending procedure.
(iii) Colour test was carried out by spraying with 10% sulphuric acid and then heating to 120° C. for 5 minutes when Shincomycin A and B give dark green and yellowish brown colours respectively.

(b) *Antimicrobial spectra of shinomycin A and B:*

Results obtained from antibacterial tests using an agar dilution method are shown in Table 2, and biological activities of shincomycin are compared with those of angolamycin in Table 3.

TABLE 2

| | MIC (mcg./ml.) | |
|---|---|---|
| | Shincomycin | |
| Test organism | A | B |
| *Staphylococcus aureus:* | | |
| 209P | 3.2 | 3.2 |
| Smith | 12.5 | 6.4 |
| Terashima | 3.2 | 3.2 |
| 3886 (PC–TC-resistant strain) | 12.5 | 6.4 |
| Actinomycin-resistant strain | 3.2 | 1.6 |
| A (EM-resistant strain) | 6.4 | 3.2 |
| E (EM–OM-resistant strain) | 6.4 | 3.2 |
| *Staphylococcus epidermis:* | | |
| I | 3.2 | 3.2 |
| II | 0.8 | <0.8 |
| *Streptococcus haemolyticus:* | | |
| 3907++ | 1.6 | 3.2 |
| 3917++ | 3.2 | 3.2 |

TABLE 2—Continued

| Test organism | MIC (mcg./ml.) Shincomycin A | MIC (mcg./ml.) Shincomycin B |
|---|---|---|
| *Streptococcus viridans:* | | |
| 4178++ | >100 | >100 |
| 4177++ | >100 | >100 |
| *Streptococcus faecalis:* | | |
| 3785++ (TC-resistant) | >100 | >100 |
| 4166 | >100 | >100 |
| *Diplococcus pneumoniae:* | | |
| Mishima++ | 50 | 100 |
| EM–OM-resistant++ | 50 | 100 |
| *Bacillus subtilis*, PCI 219 | 0.5 | 1.6 |
| *Sarcina lutea*, PCI 1001 | 0.8 | >0.8 |
| *Neisseria flava* | 3.2 | 1.6 |
| *Escherichia coli:* | | |
| NIHJ | >100 | >100 |
| Umesawa | 50 | >100 |
| K 12 | >100 | >100 |
| Umezawa (ST-resistant) | >100 | >100 |
| NIHJ (SM-resistant) | >100 | >100 |
| NIHJ (KM-resistant) | >100 | >100 |
| NIHJ (NM-resistant) | >100 | >100 |
| *Shigella flexneri:* | | |
| 2 a | >100 | >100 |
| 2 a (SM-TC-resistant) | >100 | >100 |
| 3 a | >100 | >100 |
| 3 a (SM-resistant) | 100 | >100 |
| 6 Sueishi | 25 | 50 |
| 6 Mita | 100 | 100 |
| *Shigella sonnei:* | | |
| Sensitive strain | >100 | >100 |
| (TC-CP-SM-resistant) | >100 | >100 |
| (TC-CP-SM-resistant) | >100 | >100 |
| *Salmonella typhi* | >100 | >100 |
| *Salmonella paratyphi:* | | |
| A | >100 | >100 |
| B | >100 | >100 |
| *Salmonella enteritidis* | >100 | >100 |
| *Proteus rettgeri* | >100 | >100 |
| *Pseudomonae aeruginosa* | >100 | >100 |
| *Klebsiella pneumoniae* | >100 | 100 |
| *Vibrio comma* | 100 | 100 |
| *Mycoplasma pneumoniae*, Mac [1] | 0.6 | 2.5 |
| *Mycoplasma gallicepticum* [1] | 0.6 | 1 |
| *Mycoplasma gallinarum* [1] | 2.5 | 1 |
| *Clostridium tetani* | [2] 3.1 | |

NOTE.—MIC, minimum inhibitory concentration; PC, penicillin; TC, tetracycline; ST, streptothricin; EM, erythromycin; CP, chloramphenicol; KM, kanamycin; OM, oleandomycin; SM, streptomycin; NW, neomycin; ++, results obtained from using blood agar.

[1] Activity towards Mycoplasma is tested on the following medium by the pulp-disk diffusion method:

| | |
|---|---|
| 3.4% PPLO agar ("Difco," registered trademark) | parts 7 |
| 2.5% yeast extract | do 1 |
| Horse serum (not activated) | do 2 |
| Penicillin G | units/ml 500 |
| Amphotericine B | mcg./ml 5 |
| Thallium acetate | mcg./ml 500 |

[2] Activities of shincomycin (complex).

TABLE 3

| Test organism | MIC (mcg./ml.) Shincomycin A | MIC (mcg./ml.) Angolamycin |
|---|---|---|
| *Staphylococcus aureus:* | | |
| 209P | 3.1 | [1] 12.5 |
| 209P Shionogi | 6.2 | [1] 50 |
| Smith | 6.2 | [1] 50 |
| Terashima | 3.1 | [1] 25 |
| Shirato | 6.2 | [1] 50 |
| Miura | 12.5 | [1] >50 |
| Actinomycin-resistant | 6.2 | [1] >50 |
| Hisamichi | 6.2 | [1] 50 |
| Tsukamoto | 6.2 | [1] 50 |
| Oba | 3.1 | [1] 25 |
| E | 3.1 | [2] 25 |
| C | >50 | [3] >50 |
| Sasaki | >50 | >50 |
| *Staphylococcus epidermis:* | | |
| I | 3.1 | 12.5 |
| II | 3.1 | 12.5 |
| III | 0.7 | 3.1 |
| *Sarcina lutea:* | | |
| PC I 1001 | <0.3 | 1.5 |
| Hata | <0.3 | 1.5 |
| *Micrococcus flava* | 6.2 | 25 |
| *Bacillis subtilis*, PC I 219 | <0.3 | 1.5 |

NOTE.—LM, leucomycin.
[1] EM-sensitive.
[2] EM-OM-resistant LM-sensitive.
[3] EM-OM-LM-resistant.

(c) Toxicity:

Acute LD 50 of shincomycin complex is 975 mg./kg. intraperitoneally and 415 mg./kg. intravenously in mice.

(d) Infra-red absorption bands:

When dissolved in carbon tetrachloride (using a 2 mm. cell with 2 cc. solution containing 30 mg. shincomycin), shincomycin A and B exhibit characteristic infra-red absorption spectra shown in FIGS. 1 and 2 respectively of the accompanying drawings (frequencies expressed in cm.$^{-1}$).

The infrared absorption bands of shincomycin A (in CCl$_4$) are at 3497, 2976, 2941, 1724, 1695, 1618, 1458, 1404, 1370, 1312, 1285, 1263, 1161, 1117, 1081, 1047, 993, 969, 925 and 905 cm.$^{-1}$.

Evidence presented above suggests that shincomycin is similar to several macrolide type antibiotics having ultra-violet absorption maxima at about 240 mµ (e.g., magnamycin 240 mµ; angolamycin 240 mµ; cirramycin A and B—240 mµ; PA-148 228 mµ and 280 mµ; acumycin 241 mµ).

Table 4 compares the main characteristics of shincomycin with those of several antibiotics of the macrolide type.

TABLE 4

| | Shincomycin A | Shincomycin B | Magnamycin | Angolamycin | Cirramycin A | Cirramycin B | PA-148 | Acumycin |
|---|---|---|---|---|---|---|---|---|
| Melting point (° C.) | 134–136 | 128–129 | 210–214 | 134–136, 165–168 | 122–123 | 228–229 | 115–118 | 235. |
| Elementary analysis (percent): | | | | | | | | |
| C | 60.12 | 58.26 | 59.0 | 60.54 | 64.15 | 61.57 | 58.83 | 62.55. |
| H | 8.51 | 8.44 | 8.1 | 8.98 | 8.89 | 8.40 | 5.68 | 9.19. |
| O | | 28.25 | ([1]) | ([1]) | ([1]) | ([1]) | ([1]) | ([1]). |
| N | 1.34 | 1.83 | 1.78 | 1.40 | 2.75 | 2.01 | 1.80 | 1.92. |
| [α]$_D$ | −61.2 [2] | ±0 | 154.2 [3] | −64 [2] | −20 [2] | −61 [2] | 69.3 [2] | −92. [2] |
| E 1%/1 cm. at 240 mµ | 183 | 181 | 185 | 142 | 268 | 365 | 153 | |
| Fischbach Levine tests: | | | | | | | | |
| (1) Carbomycin test | Brown | Pale reddish orange | Purple | Brown | Pink | Pink | | Colourless. |
| (2) Erythromycin test | Reddish brown | Pale reddish orange | do | Reddish brown | Light orange | Pale orange | | Pale rose. |
| Thin-layer chromatography (benzene:methanol) 55:45 | 0.68 | 0.32 | 0.75 | 0.61 | 0.23 | 0.53 | | |
| (Butanol:acetic acid:water) 3:1:1 | 0.42 | 0.42 | 0.49 | 0.33 | 0.40 | 0.40 | | |

[1] Not determined.
[2] Chloroform.
[3] Methanol.

As shown in Table 4, shincomycin A and B differ from other antibiotics of the macrolide type in the following respects:

Shincomycin A

From magnamycin: melting point, nitrogen content, colour reaction with sulphuric acid, and Fischbach and Levine tests.

From cirramycin A: specific rotation, extinction coefficient of ultra-violet absorption, Rf values on thin-layer chromatography, and Fischbach and Levine tests.

From cirramycin B: elementary analysis, melting point, and extinction coefficient of ultra-violet absorption.

From PA–148: elementary analysis, Fischbach and Levine tests, and ultra-violet absorption maximum (PA–148: maximum at 280 m$\mu$).

From acumycin: melting point, elementary analysis, specific rotation, and Fischbach and Levine tests.

From angolamycin: shincomycin A and angolamycin are somewhat similar in physico-chemical properties, but differ in specific rotation, extinction coefficient of ultra-violet absorption, and Rf values on thin-layer chromatography. Moreover, shincomycin A has ten times the antibacterial activity of angolamycin.

Shincomycin B

From magnamycin: melting point, nitrogen content. Fischbach and Levine tests, and Rf values on thin-layer chromatography.

From angolamycin: melting point, specific rotation, extinction coefficient of ultra-violet absorption, and Rf values on thin-layer chromatography.

From cirramycin A: nitrogen content, specific rotation, extinction coefficient of ultra-violet absorption, and Rf values on thin-layer chromatography.

From PA–148: melting point, specific rotation, and ultra-violet absorption maximum (PA–148; maximum at 280 m$\mu$).

From acumycin: elementary analysis, specific rotation, and Fischback and Levine tests.

These observations indicate that shincomycin differs from other antibiotics of the macrolide type.

Taxonomic properties of a shincomycin-producing strain, i.e. *Streptomyces phaeochromogenus* No. 903 (ATCC 19081)

(1) Microscopic observation: In observing morphological properties of the strain on Krainsky's glucose-asparagine agar, substrate growth consists of branched hyphae (0.8–1.2 mu) which are connected with beaded aerial mycelia. The sporophore of the aerial mycelia is straight. However, it forms clockwise or incomplete spirals on glucose-Czapek's agar. Spores borne at the apex of the aerial mycelia in the chain state are egg-shaped being 0.8–1.0 mu in size and have a smooth surface under the electron microscope.

(2) Czapek's agar (incubated at 28° C.): No growth.

(3) Krainsky's glucose-asparagine agar (incubated at 28° C.): Growth grayish brown. Aerial mycelium abundant, deep ash-gray. Soluble pigment dark brown.

(4) Ca malate agar (incubated at 28° C.): Growth pearly white, lichen-like. Aerial mycelium abundant, white. Soluble pigment pale yellow.

(5) Glucose-Czapek's agar (incubated at 28° C.): Growth yellow. Aerial mycelium abundant, white gray. Soluble pigment brownish yellow.

(6) Nutrient agar (incubated at 28° C.): Growth thin, transparent. Aerial mycelium spare, white. Soluble pigment pale yellow.

(7) Loeffer's blood serum medium (incubated at 37° C.): Growth spare. Aerial mycelium white. Soluble pigment, dark brown. No liquefaction.

(8) Potato agar (incubated at 28° C.): Growth grayish brown. Aerial mycelium abundant, gray to dark yellowish brown. Soluble pigment pale yellow.

(9) Egg agar (incubated at 37° C.): Growth thin transparent. Aerial mycelium white. Soluble pigment pale yellow.

(10) Gelatine (incubated at 20° C.): Growth brown. No aerial mycelium. Soluble pigment dark brown. Liquefaction very slow.

(11) Starch agar (incubated at 28° C.): Growth yellowish brown. Aerial mycelium abundant, gray to greenish gray. Soluble pigment pale yellow to reddish yellow.

(12) Glucose-peptone agar (incubated at 28° C.): Growth brown. Aerial mycelium abundant, white to gray-white. Soluble pigment dark brown to black.

(13) Glucose-tyrosine agar (incubated at 28° C.): Growth dark brown. Aerial mycelium dark gray. Soluble pigment dark brown.

(14) Litmus milk (incubated at 37° C.): Growth surface zone yellowish white. No aerial mycelium. Positive coagulation and peptonization. Acid production (+).

(15) Bacto-nitrate medium (Difco, incubated at 28° C.): Surface zone yellowish white. No aerial mycelium. Soluble pigment grayish brown. Reduction of nitrate very slow.

(16) Cellulose medium (incubated at 28° C.): No growth.

(17) Peptone-yeast extract-ferrate agar (Difco, incubated at 28° C.): Growth transparent. No aerial mycelium. Soluble pigment black. Production of hydrogen sulphide (+).

(18) Yeast extract-malt agar (Difco, incubated at 28° C.): Growth yellowish brown. Aerial mycelium abundant, gray. Soluble pigment brown to reddish brown.

(19) Ability to utilize carbon sources (the basal medium is the synthetic medium of Pridam and Gottlieb).

The strain can readily utilize D-glucose, D-xylose, and cellobiose. The strain cannot utilize sorbitol, inositol, saccharose, D(+)–raffinose, and cellulose, but can utilize D-trahalose, D-mannose, rhamnose and salicin.

The strain of *Streptomyces phaeochromogenus* No. 903 (ATCC 19081) according to the present invention appears rather similar to *Streptomyces phaeochromogenus* IAM 0088 under the miscroscope with respect to the hyphae in the substrate, aerial mycelium, sporphore, as well as the shape and size of spore except for a small difference in size. Observation of various slant cultures indicates that the growth of *Streptomyces phaeochromogenus* No. 903 (ATCC 19081) may be similar to that of *Streptomyces phaeochromogenus* IAM 0088, while colour tones of the pigments produced in the media apparently differ from each other.

Moreover, *Streptomyces phaeochromogenus* No. 903 (ATCC 19081) grows on the surface, while *Streptomyces phaeochromogenus* EAM 0088 grows at the bottom, when cultured in a liquid medium.

*Streptomyces phaeochromogenus* No. 903 (ATCC 19081) can use L-levulose, rhamnose, and D-mannitol, while *Streptomyces phaeochromogenus* IAM 0088 cannot use these substances. On the other hand, *Streptomyces phaeochromogenus* IAM 0026 can also utilize these substances. *Streptomyces phaeochromogenus* No. 903 (ATCC 19081) cannot use L-inositol and D(+)-raffinose, while *Streptomyces phaeochromogenus* IAM 0038 and 0026 can utilize these substances.

In the following table it is shown that other biochemical features of both *Streptomyces phaeochromogenus* IAM 0038 and No. 903 (ATCC 19081) are very similar.

TABLE

[Comparison of biochemical features of strains of *Streptomyces phaeochromogenus* 0026, 0038 and 903]

| Strains | 0026 | 0038 | 903 |
| --- | --- | --- | --- |
| Solubility of calcium malate | + | + | + |
| Hydrolysis of starch | + | + | + |
| Nitrate reduction | − | + | + |
| Tyrosinase reaction | + | + | + |
| Liquefaction of gelatin | + | + | + |
| Milk coagulation | − | + | + |
| Milk peptonization | + | + | + |
| Haemolysis | − | + | + |
| Liquefaction of serum | − | − | − |
| Production of hydrogen sulphide | + | + | + |

However, differences shown in the foregoing table are considered to be insignificant with regard to the classification of *Streptomyces phaeochromogenus* No. 903 (ATCC 19081), and this strain can therefore be classed as *Streptomyces phaeochromogenus*, according to present knowledge of mutation of the Streptomyces group.

Therefore, the strain used in the process according to the present invention may belong to a strain of the genus *Streptomyces phaeochromogenus* No. 903 (ATCC No. 19081), including each and all natural and artificial mutant strains thereof, capable of producing shincomycin. (The term "mutant strains" as used herein means strains which can be produced naturally or artifically by treating the microorganisms to cause a mutation, for example by irradiation with ultra-violet rays, X-rays or gamma-rays, or by treatment with appropriate chemical agents).

Conventional nutrient media suitable for culturing Streptomyces can be used for culturing *Streptomyces phaeochromogenus* No. 903 (ATCC 19081).

For example, the following substances can be with advantage utilized as main nutrient sources:

Nitrogen sources—soy bean meal, corn steep liquor, peanut meal, peptone, beef extract, yeast, casamino acid, urea, protein hydrolyzate, inorganic nitrates and inorganic ammonium salts.

Carbon sources—Starch, glucose, dextrin, glycerine, acetates, citrates, and other salts of organic acids. Sodium chloride, phosphates, carbonates, small amounts of metallic ions and other supplementary materials can if desired be added to the medium.

Fermentation may proceed either by the surface culture or by the shaking culture method; or with aeration and agitation. Submerged culture is particularly suitable for large scale production. The incubation temperature is desirably from 20° to 35° C., preferably from 28° to 30° C. A pH range of 5 to 8 is preferred.

It is possible to achieve a higher concentration of shincomycin in the fermentation broth when culture proceeds for from 2–5 days with shaking or by aerated submerged culture for from 1–2 days. The antibiotic according to the present invention usually accumulates in the fermentation broth, from which it can be conveniently isolated by filtering the fermented broth and then working as follows:

The filtrate is adjusted to a slightly acidic pH (pH 6.0–7.0) or to an alkaline pH and is then extracted with a suitable water-insoluble organic solvent. Particularly preferred organic solvents are lower fatty acid esters such as ethyl acetate, butyl acetate, and amyl acetate; chlorohydrocarbons such as chloroform, ethylenedichloride and methylenedichloride; ketones such as methylethylketone, methylisobutylketone, and methylpropylketone; alcohols such as butyl alcohol and amyl alcohol; ethers such as ethyl ether, butyl ether and diisopropyl ether; and benzene.

Alternatively, shincomycin can be adsorbed on to a suitable adsorbent, e.g., active charcoal or clay, and then extracted with a suitable acid solution or an at least partly water-soluble organic solvent (e.g., acetone, methanol, butanol, isopropanol or methylethylketone).

Shincomycin may also be extracted from the adsorbent with a water-insoluble organic solvent (e.g., chloroform, ethyl acetate, butyl acetate or benzene) after it has been washed with a small amount of the aforementioned at least partly water-soluble organic solvent.

In the purification step a solution of the antibiotic according to the present invention can be treated for example with oxalic acid, tartaric acid or picric acid to precipitate a salt thereof. The resulting crude antibiotic is chromatographed, for example, on alumina or silica-gel and shincomycin can be then isolated therefrom by elution e.g., with a mixture of benzene and chloroform, or a mixture of chloroform and methanol.

If desired, shincomycin A and B can be isolated from the shincomycin complex for example by thin-layer chromatography. Alternately, shincomycin A and B can also be freed from other impurities or separated from each other by counter current distribution technique, which preferably utilizes phosphate buffer solutions having different pH's and a water-insoluble organic solvent e.g., chloroform, ethyl acetate or benzene.

To isolate shincomycin in the crystalline state, organic solvents such as ether or cyclohexane, mixtures of acetone and ether or of ether and benzene, or mixtures of water and an organic solvent such as acetone, methyl alcohol, or ethyl alcohol, can be used.

The following examples in which all percentages are by weight, illustrate the invention.

EXAMPLE 1

A strain of *Streptomyces phaeochromogenus* No. 903 (ATCC 19081) was grown at 27° C. with shaking for 24 hours in 100 ml. of a medium containing 2.0% glucose, 2.0% defatted soybean meal, 0.0005% manganese chloride, 2.0% starch, 0.25% sodium chloride, 0.0005% zinc sulphate, 0.5% dry yeast, 0.0005% cupric sulphate, and 0.2% calcium carbonate, and having an adjusted pH of 7.2 after sterilization, and was then used as a seed. The composition of the production medium was as follows: 4% glycerine, 0.5% sodium chloride, 0.5% peptone, 0.2% calcium carbonate, 0.5% beef extract. The production medium was adjusted to pH 7.2 after sterilization. A 5% inoculum of the above-described seed was inoculated into one hundred and twenty 500 ml. flasks each containing 100 ml. of the production medium.

The fermentation was carried out at 27° C. on a reciprocating shaker (1227 r.p.m.). Production of shincomycin in the fermentation broth was assayed by the pulp disk diffusion method with *Bacillus subtilia* PCI 219 as test organism. After incubation at 27° C. for 35 hours, 150 mcg./ml. of shincomycin was produced. Ten litres of the harvested broth (150 mcg./ml.) were filtered to remove solid materials containing streptomyces mycelia. During fermentation, production of shincomycin was detected as follows: concentrated ethyl acetate extracts of samples of culture filtrate (taken at various time intervals) were tested qualitatively for shincomycin A and B by thin-layer chromatography. As a result, it was found that shincomycin A and B were first produced after incubating for about 10 hours.

EXAMPLE 2

The culture filtrate obtained in Example 1 was adjusted to a pH of 7.2–7.5 with sodium hydroxide solution and the antibiotics were extracted three times with 1.6 litres of ethyl acetate. The combined ethyl acetate extracts were washed with about 1 litre of neutral water. Ninety percent of antibiotics in the filtrate were thus recovered. The ethyl acetate extract was evaporated to 1.5 litre in vacuo and transferred to 500 ml. of water adjusted to pH 2.0, and the solution obtained was adjusted to pH 7.2 to 7.5 with sodium hydroxide and re-extracted with an equal amount of ethyl acetate. The ethyl acetate extract was washed with water and evaporated to 150 ml. in vacuo. Shincomycin was extracted from this concentrated ethyl acetate extract into 50 ml. of water adjusted to pH 2.0 and the solution obtained was neutralized with an ion exchange resin "Amberlite" IR–45, OH type (made by Rohm & Haas Co., U.S.A.), the word "Amberlite" being a registered trademark and freeze-dried. There was obtained crude shincomycin in the form of a pale yellowish white amorphous powder having a 3 mcg./ml. minimum inhibitory concentration against *Bacillus subtilis* PIC–210 (250 mg.).

EXAMPLE 3

Two litres of seed analogous to that described in Example 1 and 100 litres of sterilized medium for seed culture were mixed and incubated at 28° to 30° C. for 24 hours in agitated and aerated submerged culture (200 r.p.m.; 600 litres of air per minute). This culture was used as the second seed. The second seed was inoculated into fermenters containing 1000 litres of the production medium. The composition of the production medium was as follows: 4% glycerine, 0.5% sodium chloride, 0.5% beef extract, 0.2% calcium carbonate, and 0.5% peptone; its pH had been adjusted to 7.2 after sterilization. Incubation was carried out at 28° to 30° C. in agitated and aerated submerged culture (130 r.p.m.; 400 litres of air per minute). Periodical changes of pH, amount of mycelium, amount of glycerine, and biological activity (assayed by the use of *Bacillus subtilis* PCI–219) are shown in Table 5.

Table 5

| Incubation time (minutes) | pH | Amount of mycelium (ml./10 ml.) | Glycerine (percent) | Activity (mcg./ml.) |
|---|---|---|---|---|
| 0 | 7.1 | 0.10 | 3.82 | |
| 6 | 7.0 | 0.80 | 3.32 | 16 |
| 12 | 6.0 | 1.10 | 2.28 | 125 |
| 18 | 6.3 | 1.30 | 1.80 | 286 |
| 24 | 5.8 | 1.30 | 1.26 | 336 |
| 28 | 6.0 | 1.20 | 0.75 | 300 |

EXAMPLE 4

A broth filtrate obtained in an analogous manner to that described in Example 1 was adjusted to pH 7.0 with sodium hydroxide, supplemented with 2.0 weight percent active carbon by volume of the filtrate, and agitated for 20 minutes. After the shincomycin had been adsorbed on to the active carbon, the carbon was filtered off and the carbon cake washed with 50 litres of acetone to replace water in it. Shincomycin was then extracted by treating the cake with eight 300 litre portions of chloroform. The combined chloroform extract was dried with anhydrous sodium sulphate and concentrated in vacuo. A crude paste of shincomycin (complex) was obtained (800 g.; 60% yield), which was dissolved in benzene and chromatographed on a column of activated alumina (2 kg.) having 200 g. of silica gel resting on top thereof. The column was developed with benzene, and zones adsorbing shincomycin A and B were cut off. The adsorbents were developed and eluted with a mixture of benzene and chloroform (1:1), and then with a mixture of chloroform and methanol (1:0.01). The active eluates of shincomycin A and B were collected and concentrated to dryness in vacuo at a low temperature, to yield shincomycin A (60 g.) and B (40 g.) as yellowish brown amorphous powders.

EXAMPLE 5

Purification procedure of shincomycin A and B by thin-layer chromatography.

An emulsion of "Wako gel" (trade name of a gel made by and available from Wako Junyaku K. K., Osaka, Japan) containing 5% calcium sulphate was spread upon 20 cm. x 20 cm. x 3 mm. glass plates and activated at 120° C. for 2 hours after air-drying at room temperature. Thin-layer chromatography was carried out on such a glass plate. The powder obtained from Example 2 was dissolved in methanol at a concentration of 300 mg./ml. and placed on the glass plate on a line at 3 cm. distance from one edge of the glass plate with a capillary tube. Isolation of shincomycin A and B was achieved when a sample of less than 100 mg. was applied on to the glass plate and treated in the following manner: after drying the samples applied to the glass plate, the thin-layer plate was developed up to a distance of 13 cm. from the starting line by the ascending method with a solvent consisting of benzene and methanol (55:45). The plate was dried in air to remove the solvent, an area 2.5 cm. wide on one edge of the plate was sprayed with 10% sulphuric acid, and the sprayed area was carefully heated at 100° C. for 5 minutes. This procedure gave a dark violet spot at an Rf value of 0.68 and a bright brown spot at an Rf value of 0.32, respectively. Portions corresponding to the coloured spots on the chromatogram were scraped off in separate bands and repeatedly extracted with a total of 100 ml. of methanol. The methanol solutions were evaporated to dryness, extracted with small amounts of ethanol, and the products precipitated with cyclohexane. A hundred per cent yield of the activity was recovered as a white precipitate. Thus shincomycin A and B were isolated from the bands of Rf 0.68 and of Rf 0.32 as main components, respectively. These extracts were concentrated and subjected to thin-layer chromatography as described above. When 1 gm. of the powder obtained in Example 2 was placed on several thin-layer plates and chromatographed to remove further traces of contaminants, 600 mg. of shincomycin A and 200 mg. of shincomycin B were recovered.

EXAMPLE 6

Samples of a yellowish brown amorphous powder obtained in a similar manner to that described in Example 4 were dissolved in benzene at a concentration of 160 mg./ml. and were shaken with an equal amount of M/15 phosphate buffer (adjusted to pH 6.0) through 80 transfers in a Craig machine. The bulk of activities was present in the 15–30th tubes, and yellow and brown impurities were removed. Benzene solutions in tubes having higher activities were combined with a benzene solution obtained by extraction of the phosphate buffer solution, cooled, and concentrated in vacuo to yield white amorphous powders of shincomycin A and B (20 mg.; 10 mg.) having twice the activity of the yellowish brown powder described in Example 5. Samples of the powders obtained were recrystallized repeatedly in a similar manner to that described in Example 7 to yield shincomycin A and B having the aforementioned physicochemical properties.

EXAMPLE 7

One gram of white amorphous powder, which was obtained in an analogus manner to that described in Example 6, was dissolved in 10 ml. of slightly warm ethyl ether and the solution was then filtered. The filtrate was cooled to ambient temperature to yield a precipitate, which was filtered off. The precipitate was then dissolved in 2 ml. of benzene, with gentle warming. 10 ml. of ethyl ether were added to the solution, which was cooled to yield crystals. The crystals obtained were dissolved in 2 ml. of warm benzene, which was left at ambient temperature to yield crystalline shincomycin A (600 mg.) (melting point: 134–136° C.). Shincomycin B (800 mg.) was obtained in a similar manner.

EXAMPLE 8

Vivo tests were conducted on mice to illustrate the effectiveness of various concentrations of shincomycin A and B as previously described on the treatment of animals infected with *Staphylococcus aureus*.

The test procedure was as follows:

Tested animal: Mice dd (20 g.+2 g.)
Number of mice for each dose: 5

Procedure: *Staphylococcus aureus* was suspended in sterilized water, which was administered to the mice by intravenous injection in an amount of 0.5 ml./mouse. After one hour, mice were administered shincomycin mixture of A and B which was dissolved in sterilized water to give the different concentrations shown in Table I.

The relationship between the drug level and mortality ratio was determined by intravenous injection of the mixture of shincomycin A and B. In each case, *Staphylococcus aureus* was the infecting organism.

Table I

| | Death in days | | | | |
|---|---|---|---|---|---|
| | Day | | | | |
| Drug level, mg./kg. | 0 | 1 | 2 | 3 | Mortality ratio |
| 138 | 0 | 0 | 0 | 0 | 0/5 |
| 69 | 0 | 0 | 0 | 1 | 1/5 |
| 34 | 0 | 0 | 1 | 2 | 1/5 |
| 17 | 0 | 3 | 2 | 0 | 3/5 |
| 8 | 0 | 4 | 1 | 0 | 5/5 |
| Control (0) | 0 | 4 | 1 | 0 | 5/5 |

As shown in Table I shincomycin showed distinct positive results at concentration levels of 34 mg./kg. and higher, and was particularly effective at 138 mg./kg. As compared with the control, shincomycin was safe at all levels tested.

Shincomycin A and B are useful for curing various infections of non-human animals (e.g. pig, cattles, fowls), for example, those caused by pneumococcus, nycoplasma etc. and bacterially caused diarrhoea etc. In such case, they are administered by injection intravenously (30–50 mg./kg.) or by mouth (5–500 g./l. ton of feed stuff) one a day.

What we claim is:

1. A process of producing shincomycin, a complex of shincomycin A and shincomycin B which comprises cultivating a culture medium inoculated with *Streptomyces phaeochromogenus* No. 903 (ATCC No. 19081) including mutants thereof under conditions suitable for cultivating the Streptomyces group, and recovering shincomycin from fermented culture broth.

2. A process according to claim 1 wherein the said culture medium comprises a source of assimilable carbon, a source of assimilable nitrogen and inorganic salts.

3. A process according to claim 1 wherein said culture medium is glucose-soybean meal medium.

4. The process of claim 1 wherein shincomycin is recovered from the fermented cultured broth by adsorbing shincomycin on an adsorbent.

5. The process of claim 1 wherein shincomycin is recovered from the fermented culture broth by separating off the culture broth from unwanted insoluble materials including organism growth, acidifying the resulting liquor containing crude shincomycin and recovering the resultant crude acid precipitated shincomycin precipitate.

6. A process of producing shincomycin which comprises cultivating a culture medium under aerobic conditions inoculated with a shincomycin-producing strain *Streptomyces phaeochromogenus* No. 903 (ATCC No. 19081) including mutant thereof for about 2–5 days at a temperature of about 20–35° C., separating off the fermented culture broth from unwanted insoluble materials including organism growth, acidifying the resulting liquor containing crude shincomycin, separating the resulting crude acid precipitated shincomycin precipitate from the inactive liquid and recovering the shincomycin therefrom.

7. An antibiotic substance, shincomycin A, being substantially active towards gram positive microorganisms and having active ingredients which are heat reliable and which are unstable in aqueous alkaline solution, said composition being characterized by the following characteristics:

state—colorless needle
melting point—about 134–136° C.
elementary analysis—60.12% carbon, 8.51% hydrogen and 1.35% nitrogen
molecular weight (osmometer)—1033
molecular formula—$C_{52}H_{89}O_{19}N$
specific rotation—$[\alpha]_D = -61.2°$ (c:1.25 chloroform)
infra-red absorption in accordance with FIG. 1
solubility—easily soluble in chloroform, benzene, acetone, methanol, ethanol, and ethylacetate, partly soluble in carbon disulfite and ether; and insoluble in water and petroleum ether.
color reaction:
  Fehling's reaction—positive
  Tollens' orcinol reaction action—red
  sulfuric acid—brown
Fischbach and Levine's reaction:
  carbomycin—brown
  erythromycin test—reddish brown
stability: stable in neutral or acidic aqueous solution; and unstable in aqueous alkaline solution
RF values of thin-layer chromatography using silica gel including 5% calcium sulfate:
  solvent:
    methanol:benzene (45:55)—0.65
    chloroform:methanol (4:1)—0.66
    acetone—0.32
    butanol:acetic acid: water (3:1:1)—0.39
    color reddish brown.

8. An antibiotic substance shincomycin B, being substantially active towards gram positive microorganisms and having active ingredients which are heat reliable and which are unstable in aqueous alkaline solution, said composition being characterized by the following characteristics:

state—colorless crystalline powder
melting point—about 128–129° C.
elementary analysis—58.6% carbon, 8.44% hydrogen, 28.25% oxygen and 1.83% nitrogen
molecular weight (osmometer)—1062
molecular formula—$C_{89}H_{90}O_{20}N$
specific rotation—$[\alpha]_D = \pm 0$ (c:1.25 chloroform)
Infra-red absorption in accordance with FIG. 2
solubility—easily soluble in chloroform, benzene, acetone, methanol, ethanol, and ethylacetate; partly soluble in carbon disulfite and ether; and insoluble in water and petroleum ether.
color reaction:
  Fehling's reaction—negative
  Tollens' orcinol reaction—orange
  sulfuric acid—yellow
  Fischbach and Levine reaction:
    Carbomycin test—bright reddish orange
    erythromycin test—bright reddish orange
stability—stable in neutral or acidic aqueous solution; and unstable in aqueous alkaline solution.
$R_f$ values of thin-loyer chromatography using silica gel including 5% calcium sulfate:
  solvent:
    methanol:benzene (45:55)—0.40
    chloroform:methanol (4:1)—0.38
    acetone—0.18
    butanol:acetic acid:water (3:1:1)—0.39
    color—yellowish brown.

References Cited

Yagisawa, E., New Antibiotics of Japan in 1965, Jap. Med. Gazette 3(2):4, Feb. 20, 1966.

Derwent Farm Doc. 28425, French Patent No. 1,486,376, Published June 23, 1967, pp. 281–284.

ALBERT T. MEYERS, Primary Examiner

J. D. GOLDBERG, Assistant Examiner

U.S. Cl. X.R.

195—80; 424—121